United States Patent [19]
Carleton et al.

[11] Patent Number: 5,966,351
[45] Date of Patent: Oct. 12, 1999

[54] SYSTEM AND METHOD FOR CHANGING THE PRIORITY OF VOICE MAIL MESSAGES WITHIN THE RECIPIENT'S MAILBOX

[75] Inventors: Ronald Robert Carleton, San Jose; William Joseph Beyda, Cupertino; Shmuel Shaffer, Palo Alto, all of Calif.

[73] Assignee: Siemens Information and Communications Networks, Inc., Boca Raton, Fla.

[21] Appl. No.: 08/960,294

[22] Filed: Oct. 29, 1997

[51] Int. Cl.⁶ .................................................. H04M 11/10
[52] U.S. Cl. ........................... 369/29; 379/88.22; 379/76
[58] Field of Search .................................. 369/25, 26, 27, 369/29; 379/67.1, 68, 74, 75, 76, 88.22, 88.23, 88.26

[56] References Cited

U.S. PATENT DOCUMENTS

| | | |
|---|---|---|
| 4,935,954 | 6/1990 | Thompson et al. ........................ 379/89 |
| 5,003,575 | 3/1991 | Chamberlin et al. ...................... 379/89 |
| 5,008,835 | 4/1991 | Jachmann et al. . |
| 5,033,077 | 7/1991 | Bergeron et al. .......................... 379/67 |
| 5,153,905 | 10/1992 | Bergeron et al. . |
| 5,353,259 | 10/1994 | Howes et al. . |
| 5,440,623 | 8/1995 | Moore et al. . |
| 5,742,668 | 4/1998 | Pepe et al. ................................ 379/58 |

*Primary Examiner*—Tan Dinh

[57] ABSTRACT

A system and method for enabling the sender of electronic mail messages to access a recipient's mailbox to reprioritize the messages previously sent by the sender. The system searches the recipient's mailbox for messages sent by the sender and unread by the recipient. An unopened message counter is used to determine the number of unopened messages in the recipient's mailbox. A message review unit enables the sender to review the unread messages. A message prioritization unit is used to reprioritize the unread messages.

17 Claims, 3 Drawing Sheets

| SENDER | DATE | TIME | OPTIONS | STATUS | ively sent information.

SYSTEM AND METHOD FOR CHANGING THE PRIORITY OF VOICE MAIL MESSAGES WITHIN THE RECIPIENT'S MAILBOX

BACKGROUND OF THE INVENTION

1. Field of the Invention

This invention generally relates to a message prioritization system and, more particularly, to a message prioritization system for changing the priority of messages in a recipient's mailbox.

2. Description of the Prior Art

Message processing systems have been in widespread use for many years. These systems, such as a voice messaging system, are commonly used as message sending, receiving and storing tools. In particular, voice messaging systems are commonly known as voice mail systems (VMS). In such systems, each user is assigned a mailbox wherein messages sent to the user are saved. The recipient of a message, upon accessing the VMS, may retrieve messages from his or her mailbox. In the past, voice mail systems had limited capabilities. For example, users of the earliest systems could only send messages and store messages for later playback.

As technology progressed, advanced functionality was added to the VMS. In particular, present day systems not only store messages, but can forward messages to one or more recipients; message replies can be automatically sent to the sender; and messages can be attached to other messages before being sent to their final destination. Even in present-day systems, however, messages once received by the recipient are stored chronologically, i.e., in the order received, in the recipient's mailbox. Similarly, the recipient retrieves the messages in the order in which they were received.

In addition, certain voice mail systems are known to have the ability to assign handling codes to messages. Typically, the handling codes enable a message to be sent to the recipient carrying a special "tag" to indicate to the system that the message requires special handling. For example, it is known that messages, before being sent, may be tagged "private" to prevent the recipient from forwarding the message to others. A message may also be tagged "priority," which causes the message to jump to the first position in the mailbox, ahead of all the other messages in the recipient's mailbox. This enables urgent messages to be read first. Other various tags may also be available depending on the particular manufacturer of the VMS and the implemented features.

However, no known system is available wherein messages may be accessed by the sender after the messages have been sent and stored in the recipient's mailbox. Generally, once the sender has sent a message, the disposition of the message is out of the sender's control. Certain voice mail systems are known to allow the sender to delete unread messages from the recipient's mailbox, but only while a message is being sent, and before the sender terminates the connection or explicitly commands the VMS 90 to send the message.

There are certain situations when the sender may need to change a previously sent message. In particular, the sender may have provided background information regarding a particular issue in a message, but several facts may have changed subsequently. In such an instance, the sender may send a subsequent message with updated facts, but may want to maintain the original message so as to not repeat previously sent information.

Unfortunately, during the course of a business day, the priority of certain issues may often change, thereby requiring subsequent messages to be sent to notify the recipient of the changed priorities. As such, excess messages may fill up the recipient's mailbox preventing other sent messages which perhaps change the priority of earlier messages from being stored. This can cause the recipient to possibly send out errant replies based on outdated messages. Because a sender does not have access to the contents of a recipient's mailbox, the sender cannot reorder the messages into a understandable desired order. Therefore, the sender is compelled to send subsequent messages to clarify previously sent messages What is needed, therefore, is a system that allows the sender of the messages to reprioritize or reorder unopened messages that are stored in the recipient's mailbox.

SUMMARY OF THE INVENTION

The present invention relates to a system and method for enabling the sender of electronic mail messages to access the contents of a recipient's mailbox to reprioritize the messages previously sent by the sender. The system searches the recipient's mailbox for messages sent by the sender and unread by the recipient. A message counter is used to determine the number of, if any, unopened messages in the recipient's mailbox. A message review unit enables the sender to replay and review the unread messages sent by the sender in determining which messages have not yet been read by the recipient. A message prioritization unit is used to reprioritize the unread messages such that the recipient may access them in the order intended by the sender.

BRIEF DESCRIPTION OF THE DRAWINGS

Other features, objects and advantages of the present invention will become readily apparent and understood upon consideration of the following detailed description and attached drawings, wherein.

DETAILED DESCRIPTION OF THE INVENTION

The present invention relates to a voice mail system for enabling a sender of one or more messages to reprioritize, i.e., reorder, the sequence of unread messages in a recipient's mailbox that were sent by the sender. The present invention includes a message counter to determine the number of, if any, unopened messages in the recipient's mailbox. A message review unit enables the sender to replay and review the unread messages. A message reprioritization unit is used to enable the sender to reprioritize or reorder the unread messages in the recipient's mailbox.

Figure 1:
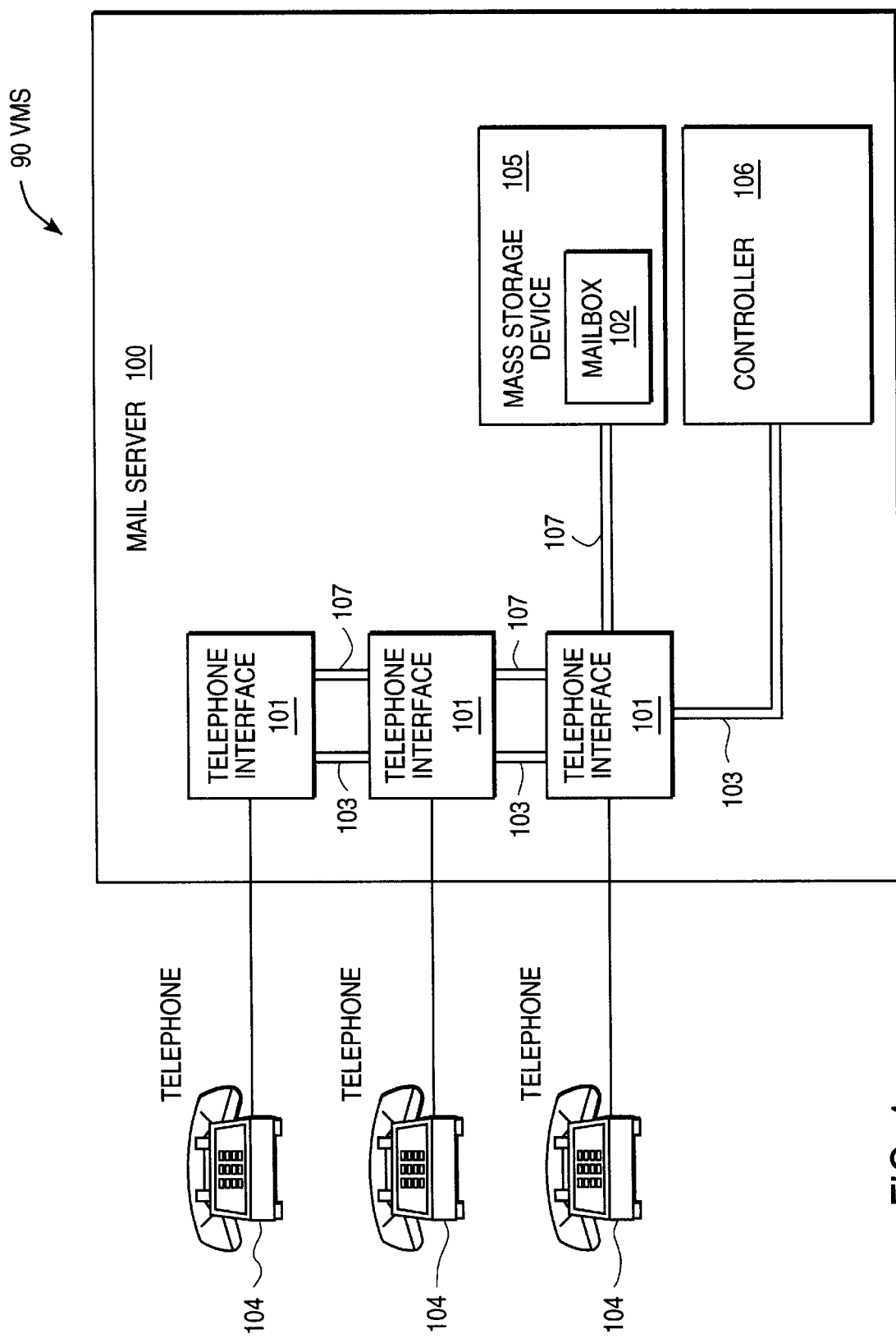
FIG. 1 is an overall block diagram of a known voice mail system.

A known voice mail system (VMS) 90 (FIG. 1) generally includes a mail server 100 having telephone interfaces 101 and a mass storage device 105, such as a hard disk drive, having a controller 106. The mail server 100 is typically a microprocessor or microcontroller-based control unit that controls the operation of the VMS 90. Mailboxes 102 are portions of space reserved on the mass storage device 105 for a particular user for storing messages. Each of the telephone interfaces 101 is connected to a telephone 104. It is to be noted that FIG. 1 is representative of only one of many possible voice mail systems and configurations, and is therefore exemplary only.

The telephone interfaces 101 are used to receive voice signals over telephone lines and to convert them to appropriate digital format for storage and later retrieval from the mass storage device 105. In addition, telephone interfaces 101 also perform functions such as ring detection, dial signal generation, off-hook detection, etc. In operation, control signals from the telephone interfaces 101 are transmitted to the mass storage controller 106 over a control bus 103 and voice signals, which have been converted into a digital signal using an analog to digital converter, are transmitted to the mass storage device 105 over a data bus 107. Typically, the telephone interfaces 101 receive voice signals, such as speech, in analog form and receive control signals in the form of dual tone multi frequency (DTMF) tones generated by keypresses on the DTMF numeric keypad (not shown) of the telephone 104. The mail server 100 responds to the control signals to telephone interfaces 101 and the mass storage controller 106 to identify voice signals with selected addresses and stores them on the mass storage device 105 for retrieval at a later time.

Figures 2, 3:
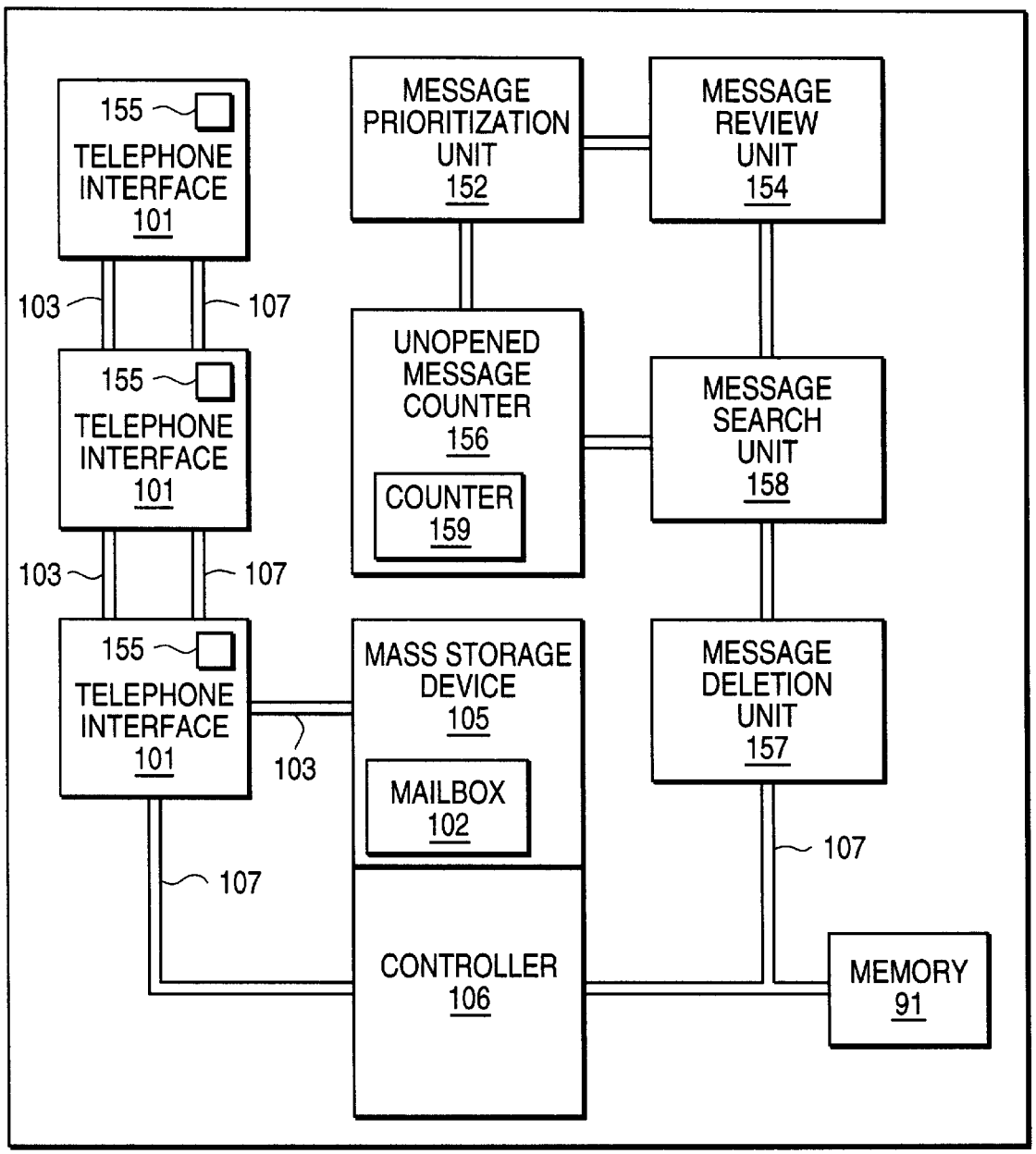
FIG. 2 is a block diagram of the voice mail system in accordance with the present invention.
FIG. 3 is a diagram of a message header.

Turning to FIG. 2, a block diagram of a message reprioritization system implemented in a VMS 90 in accordance with the present invention is illustrated. It should be understood that the present invention is also applicable to E-Mail systems and other electronic message storage and retrieval systems. An important aspect of the invention is the ability of the sender to reprioritize messages sent by the sender to the recipient even after the messages have been received by the recipient and stored in the recipient's mailbox. As will be discussed in more detail below, the message prioritization unit 152 in accordance with the present invention enables the sender to access the contents of the recipient's mailbox in order to reprioritize messages sent by the sender to the recipient, thus obviating the need for unnecessary additional message generation. In particular, it is known that messages stored in a mailbox are stored sequentially. As such, the recipient is able to retrieve messages only in the order that they were received. Thus, a message sent at a time later than an earlier sent message can be accessed only after the first message has been reviewed or retrieved by the recipient. This creates a situation where the recipient may answer or respond to a message via a return message, before realizing that a later sent message may have had an effect on how the recipient should have responded. This results in a follow up message that needs to be sent to clear up any confusion. It can be seen that the unnecessary or incorrect messages result in wasted time and message storage space.

In the present system, the mail server 100 further includes, as will be discussed further below, a message search unit 158, an unopened message counter 156, a message review unit 154, a message prioritization unit 152 and a message deletion unit 157, all of which are interconnected by data bus 103 to hard drive controller 106. Data bus 103 is used to transmit command messages between the various components. The message search unit 158, unopened message counter 156, message review unit 154, message prioritization unit 152 and message deletion unit 157 may each be implemented as software running on a microprocessor or controller (not shown).

The mail server 100 includes a general purpose microcontroller or central processing unit (not shown) which is the primary controller for the VMS 90 and is responsible for, among other things, controlling all of the messaging functions of the VMS 90, including enabling messages to be recorded, sending the messages to their proper destinations and enabling playback of the messages once they are retrieved. The message search unit 158 is used for locating unopened messages and accesses the recipient's mailbox to determine whether any unopened messages from the sender to the recipient exist. The unopened message counter 156 counts the number of unopened messages found by the message search unit 158 and sends a signal to the sender indicating the number of unread messages from the sender to the recipient that are stored in the recipient's mailbox. Upon determining the number of unopened messages, the message review unit 154 enables the sender to review the unopened messages in the recipient's mailbox. During or after completion of the message review, the message prioritization unit 152 enables messages in the recipient's mailbox to be reprioritized by the sender. The system of the present invention may be easily adapted for implementation in most E-Mail and Voice Mail type systems.

For security reasons, the system of the present invention is configured such that the sender may access only his or her own messages that have been stored unread in the recipient's mailbox. This is enforced by the VMS 90 at the time the sender logs on using commonly known and used identification techniques. In particular, during user log in, the VMS 90 checks the electronic identification of the telephone from which the call is being placed or requires the caller to enter the extension that the caller registered under. The VMS 90 then verifies the identity of the person logging into the system by requiring the user to enter a security or identification password associated with the user's extension. The code is entered via the DTMF keypad of the telephone. The mail server 100 then cross-references the user entered code with an existing list stored in a memory 91 the VMS 90 that contains a list of all authorized users and their respective passwords. If a match is found, the system enables the user to gain further access to the functions of the VMS 90. If no match is found, the VMS 90 denies further access to the system.

As shown in FIG. 3, voice mail messages typically have electronic header information for uniquely identifying each message on the VMS. Although the format of such information may vary from system to system, basic header information includes the sender's extension, the date and time the message was sent and the status of the message, along with any special handling code. Therefore, in the present invention, when the sender is accessing a message in the recipient's mailbox, the mail server compares the header information of the message or messages in the recipient's mailbox to the sender login identification information entered by the sender, to determine whether the user was indeed the sender of the messages. Upon verification that the sender sent the message, the sender, after gaining access to the messages in recipient's mailbox, will be allowed by the system to have access to only those messages carrying the sender's electronic identification header.

Referring once again to FIG. 2, after the sender has gained initial entry into the VMS 90, as described above, the system of the present invention is activated initially by the sender of a message pressing a predetermined series of buttons on the DTMF keypad of the touch tone telephone 104. A DTMF decoder 155 in the telephone interface 101 decodes the tones and transmits a signal for use by the message search unit 158 instructing it to access the portion of the disk 105 containing the recipient's mailbox to determine whether any unopened messages from the sender are stored in the recipient's mailbox 102.

For example, the sender, after logging in, may press star (*) 99 on the DTMF keypad followed by a numerical combination, to enable the message prioritization system. The sender then keys in the extension number of the recipient. The tones generated by the DTMF keypad are then decoded by the DTMF decoder 155 in the telephone interface 101. The telephone interface 101, upon decoding the tones, sends a signal to the mail server 100, indicating that the sender requires access to messages sent by the sender to the recipient that are unread and stored in the recipient's mailbox.

In particular, the mail server 100 sends a signal to the mass storage device 105 to allow read access to the portions of the mass storage device 105 containing the recipient's unread mail. The message search unit 158, upon -accessing the recipient's mailbox, scans the header information of each message in search of the sender's extension in order to determine whether any messages from the sender are present within the recipient's mailbox. The message search unit 158 also scans the status information in the message header (FIG. 3) to determine whether the message has been read. Upon finding an unread message, the message search unit 158 sends a signal to the unopened message counter 156. For each unopened message sent by the sender that the message search unit 158 finds, a signal is sent to the unopened message counter 156.

The unopened message counter 156 receives the signal from the message search unit 158 and increments an internal counter 159 to count each unread mail message in the recipients mailbox that was sent by the sender. The above process is repeated for each such mail message until all the unread messages sent by the sender are counted. The unopened message counter 156 then sends a signal to the mail server 100 indicating the number of unopened messages that are located within the recipient's mailbox. The mail server 100 may then generate a voice synthesized message informing the sender of the number of unread messages sent by the sender that are unread by the recipient and stored in the recipient's mailbox. The number of unopened messages is supplied to the sender mainly as a matter of convenience for helping the sender to determine whether the prioritization process should proceed. For example, if the system indicates that only one unopened message from the sender exists in the recipient's mailbox, the prioritization process is not necessary. On the other hand, if the system indicates numerous unread messages, the sender may feel that message review is necessary to remind himself of the contents of the messages before actually reprioritizing the messages.

Upon determining the number of unopened messages, the message review unit 154 may be used by the sender to review the unopened messages in the recipient's mailbox. In particular, after the sender has gained access to recipient's mailbox, the sender can transmit a signal to message review unit 154 for enabling the messages to be reviewed. The review command messages are also sent using predetermined DTMF keypad keypresses. For example, the sender may press the star key (*) followed by a predetermined digit, such as 7, to activate the review process. The mail server 100, upon receiving such a signal, will then play the first stored message sent by the sender. After reviewing the message, the sender can then use the DTMF keypad to step through the other messages sent by the sender. In particular, the star key (*) may be used to read messages earlier in the list and the pound sign (#) may be used to read messages later in the list.

After completion of message review, the message prioritization unit 152 enables messages in the recipient mailbox to be reprioritized by the sender or the message deletion unit 157 may be used to delete one or more messages. Therefore, after the sender has reviewed one or more of the stored messages, the sender may feel the need for the order of the messages to be reprioritized, or to even delete certain messages.

The message deletion unit 157 enables the sender to delete one or more messages sent by the sender, as mentioned above, by pressing the appropriate sequence of keys on the DTMF pad on the telephone 104. In particular, as each message is reviewed, the sender may use the DTMF keypad to enter deletion commands. For example, the, sender, upon reviewing each message may feel that a particular message is no longer necessary and should be deleted. By keying the appropriate commands on the DTMF keypad, such as 12, the sender can select the second reviewed message for deletion. After selecting the message, the sender can then press the appropriate DTMF key sequence, such as #3, to delete the message. The system is designed to prevent accidental message deletion. In particular, confirmation of the deletion command is requested before the message is deleted from the recipient's mailbox.

The message prioritization unit 152 enables the sender to reprioritize or reorder any messages sent by the sender, as mentioned above, by pressing appropriate numbers on the DTMF keypad. In particular, as each message is viewed, the sender may use the DTMF keypad to enter reprioritization commands. For example, the sender, upon reviewing first and second stored messages, may feel that the second message should be heard by the recipient first. By keying the appropriate commands on the DTMF keypad, such as 12, the sender can select the second reviewed message for moving. After selecting the message, the sender can then press the appropriate DTMF key, such as #, to shift the message down, effectively changing the first stored message into the second stored message thereby enabling the originally second message to be reviewed first by the recipient. Similarly, for example, in a mailbox containing five messages from the sender, the sender can review the messages and select the fourth message to be reprioritized by pressing *4 for the message number to be reviewed and pressing 14 to select the message for reprioritization. The sender then presses the appropriate keys to move the message up or down within the list of messages. For example, the sender can press the # key to move the message down a single place for each keypress, or press * to move the message up a single place. This sequence can be repeated numerous times to move one or more messages up or down several places. The sender may then press *0 to indicate to the system that the sender is ready to exit the system. Thus, when the recipient accesses his mailbox, the system will replay the messages in the order the sender feels is appropriate. It should be noted that the command numbers and keystrokes described above are exemplary only and may vary with each implementation.

Figure 4:
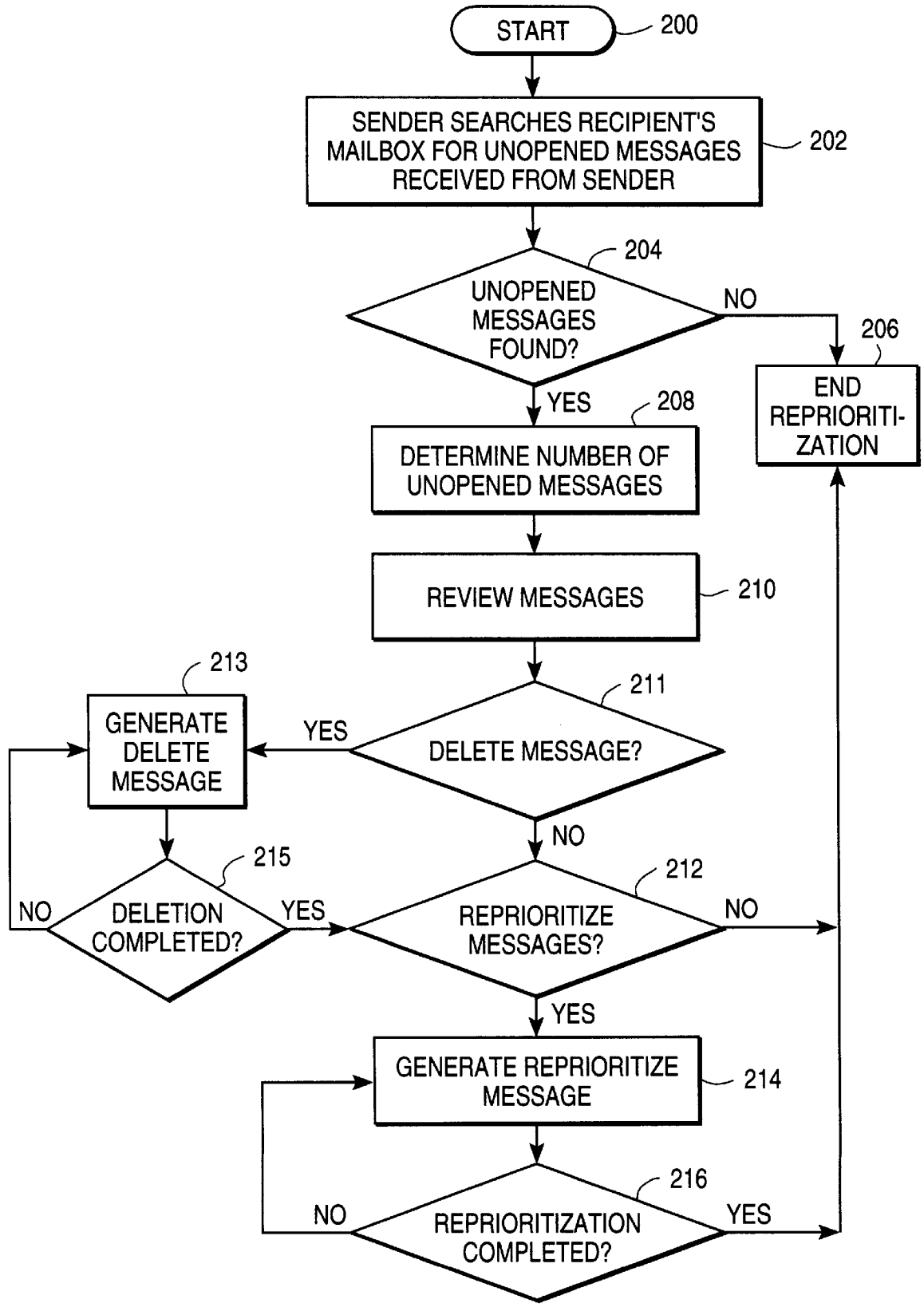
FIG. 4. is a flow diagram for reprioritizing messages in accordance with the present invention.

Referring to FIG. 4, a flow diagram is shown depicting a message reprioritization routine for reprioritizing messages in a recipient's mailbox. In step 200, the sender prepares to access the voice mail system 90. In step 202, the sender presses the correct sequence of keys on the touch tone keypad and sends a message to recipient's mailbox. The system, upon detecting the sent message, instructs the message search unit 158, which may be implemented as a software program, to search the recipient's mailbox for unopened messages sent by the sender. If no unopened messages are found in step 204, the mail server automatically exits the reprioritization routine in step 206. It is to be noted that the sender has the option of exiting the reprioritization routine at any time if so desired. Upon finding one or more unopened messages in step 204, the unopened message counter 156 will return a message to the sender indicating the number of unopened messages in the mailbox in step 208.

In step 210, the message review unit 154, which may also be a software program, is called by the sender to review the contents of the unopened messages. The sender may, in step 211, determine whether the message deletion unit 157, which may be a software program, needs to be called to delete one or more messages. If the message is to be deleted, a signal is sent in step 213 indicating that the selected message is to be deleted. The system then proceeds to step 215 wherein the sender may indicate if the deletion process is complete. If the sender desires to continue deletion, the system will return to the previous step. Once deletion is completed, or if the user desires no messages to be deleted, the system will exit the deletion system and move on to reprioritization step 212. The sender may decide in step 212 whether the messages needs to be reprioritized. If reprioritization is not required or necessary, the system exits the reprioritization process in step 206. If prioritization is needed, the sender in step 214 presses the appropriate DTMF touch tone key to generate a message to activate the message prioritization unit 152, which may also be a software program. The system upon receiving the message will move the appropriate messages up or down in the queue of messages sent by the sender. Thus, for example, later sent message may be saved higher in the queue than an earlier sent message, thereby causing the recipient to review the later sent message first. The system then proceeds to step 216 wherein the sender may indicate if the reprioritization process is complete. If the sender desires to continue reprioritization, the system will return to the previous step. Once reprioritization is complete, the system will exit the reprioritization system in step 206. It is to be noted that the present invention is not limited to solely changing the priority of mail messages. It is well within the scope of the system to enable the sender of messages to delete unnecessary unread messages in the recipient's mailbox. Furthermore, the sender may also consolidate his or her messages, that were sent by the sender, such that during playback by the recipient, all the messages sent by the sender will be played in order without interruption from other saved messages.

It is to be understood that the present invention is a powerful tool for enabling the sender of a message to access and manipulate his or her own earlier sent messages in a recipient's mailbox. It is left to the VMS administrator or system designer to enable and disable features as needed.

Obviously, many modifications and variations of the present invention are possible in light of the above teachings. Thus, it is to be understood that, within the scope of the amended claims, the invention may be practiced otherwise than as specifically described above.

What is claimed is:

1. A message priority reordering system in an electronic message processing system for enabling the sender of at least one message to reorder the priority of the messages in a predetermined recipient's mailbox, comprising:

a recipient search unit configured to search the predetermined mailbox for at least one unopened mail message;

a message review unit configured to enable access by said sender to the predetermined mailbox for reviewing said at least one unopened mail message; and a message prioritization unit configured to allow said sender to reorder said at least one unopened mail message.

2. The message priority reordering system of claim 1, wherein said messages are voice mail messages.

3. The message priority reordering system of claim 1, wherein said messages are electronic mail messages.

4. A message priority reordering system in an electronic message processing system for enabling the sender of at least one message to reorder the priority of the messages in a predetermined recipient's mailbox, comprising:

a recipient search unit configured to search the predetermined mailbox for at least one unopened mail message;

a message review unit configured to enable access by said sender to the predetermined mailbox for reviewing said at least one unopened mail message;

a message prioritization unit configured to allow said sender to reorder said at least one unopened mail message; and an unopened message counter configured to count the number of said at least one unopened mail message.

5. A message priority reordering system for enabling a message sender to reorder unread messages that were sent by the sender in a recipient's mailbox, comprising:

means for determining whether the mailbox contains unread messages sent by the sender;

means responsive to said determining means for enabling access to said recipient's electronic mailbox; and means responsive to determining means for enabling the message sender to reorder said unread messages.

6. A message priority reordering system for enabling a message sender to reorder unread messages that were sent by the sender in a recipient's mailbox, comprising:

means for determining whether the mailbox contains unread messages sent by the sender;

means responsive to said determining means for enabling access to said recipient's electronic mailbox;

means responsive to said determining means for enabling the message sender to reorder said unread messages; and means for determining the number of unread messages in the mailbox.

7. The message priority reordering system of claim 6, wherein the recipient's mailbox is configured to store electronic mail messages and voice mail messages.

8. The message priority reordering system of claim 6, further including means for enabling only the sending of said unread messages to access said electronic mailbox.

9. A method for enabling the sender of electronic messages to reprioritize unread messages sent by the sender and stored in the recipient's mailbox, comprising:

searching the recipient's mailbox for unread messages;

enabling the sender to obtain access to the recipient's mailbox if unread messages are found; and allowing the sender to reorder said unread messages.

10. The method of claim 9, further including verifying that only the sender of the message is authorized to reprioritize unread messages in the recipient's mailbox.

11. An electronic message processing system for enabling a sender to send messages to a recipient, comprising:

a communications device configured to enable the sender to send messages to the recipient;

a mailbox configured to hold the messages sent by the sender to the recipient;

a message review unit configured to enable the sender of the messages to access the recipient's mailbox for reviewing mail messages sent by the sender and reorder said mail messages.

12. An electronic message processing system for enabling messages to be sent by a sender to a recipient, comprising:

a communications device configured to enable the sender to send the messages to the recipient;

a mailbox configured to hold the messages sent by the sender to the recipient;

a message prioritization unit configured to enable the sender of the messages to reorder the messages stored in said mailbox to alter the sequence in which messages are reviewed by the recipient.

13. An electronic message processing system for enabling a sender to send messages to a recipient, comprising:

a communications device configured to enable the sender to send messages to the recipient;

a mailbox configured to hold the messages sent by the sender to the recipient;

a message review unit configured to enable the sender of the messages to access the recipient's mailbox for reviewing the contents of said mail messages sent by the sender and reorder said mail messages.

14. An electronic message processing system for enabling a sender to send messages to a recipient, comprising:

a communications device configured to enable the sender to send messages to the recipient;

a mailbox configured to hold the messages sent by the sender to the recipient;

a message search unit configured to enable the sender of the messages to access the recipient's mailbox for determining whether any unopened messages are stored in the recipient's mailbox; and a message prioritization unit configured to allow said sender to reorder said unopened messages.

15. An electronic message processing system for enabling a sender to send messages to a recipient, comprising:

a communications device configured to enable the sender to send messages to the recipient;

a mailbox configured to hold the messages sent by the sender to the recipient;

a message counting unit configured to determine the number of mail messages in said mailbox that were sent by the sender that are unread by the recipient.

16. An electronic message processing system for enabling a sender to send messages to a recipient, comprising:

a communications device configured to enable the sender to send messages to the recipient;

a mailbox configured to hold the messages sent by the sender to the recipient;

a message review unit configured to enable the sender of the messages to access the recipient's mailbox for reviewing mail messages sent by the sender and reordering said mail messages.

17. An electronic message processing system for enabling a sender to send messages to a recipient, comprising:

a communications device configured to enable the sender to send messages to the recipient;

a mailbox configured to hold the messages sent by the sender to the recipient;

a message deletion unit configured to enable the sender of the messages to access the recipient's mailbox to reorder and to delete any unopened messages that are stored in the recipient's mailbox that were sent by the sender.

* * * * *